(12) United States Patent
Schmidt (10) Patent No.: US 11,857,908 B2
(45) Date of Patent: Jan. 2, 2024

(54) APPARATUS AND METHOD FOR AIR PURIFICATION AND POWER GENERATION

(71) Applicant: Walter Corporation LLC, Taylorsville, UT (US)

(72) Inventor: Waynard Schmidt, Taylorsville, UT (US)

(73) Assignee: Walter Corporation LLC, Taylorsville, UT (US)

( * ) Notice: Subject to any disclaimer, the term of this patent is extended or adjusted under 35 U.S.C. 154(b) by 0 days.

(21) Appl. No.: 17/683,956

(22) Filed: Mar. 1, 2022

(65) Prior Publication Data

US 2022/0331732 A1   Oct. 20, 2022

Related U.S. Application Data

(63) Continuation of application No. 17/232,901, filed on Apr. 16, 2021, now Pat. No. 11,278,839.

(51) Int. Cl.
  *B01D 47/02* (2006.01)
  *F03D 9/46* (2016.01)
  (Continued)

(52) U.S. Cl.
  CPC ........... *B01D 47/024* (2013.01); *B01D 46/62* (2022.01); *F03D 9/007* (2013.01); *F03D 9/11* (2016.05);
  (Continued)

(58) Field of Classification Search
  CPC .. B01D 47/024; B01D 46/62; B01D 2221/16; B01D 2247/14; B01D 46/0009; B01D 46/12; B01D 46/429; B01D 47/02; F03D 9/007; F03D 9/11; F03D 9/46; F03D 3/02; F03D 3/002; F05B 2240/9113; F05B 2260/42; F05B 2220/708; Y02B 10/30; Y02E 10/728; Y02E 10/74; Y02E 70/30; Y02P 80/10
  See application file for complete search history.

(56) References Cited

U.S. PATENT DOCUMENTS 2,007,759 A * 7/1935 Harmon ................. B01D 47/16
                                                                        261/89
2,380,065 A * 7/1945 Newcomb ............ B01D 47/022
                                                                        96/336
(Continued)

FOREIGN PATENT DOCUMENTS

CN          205351176 U      6/2016
CN          207247056 U      4/2018
CN          112146196 A     12/2020

*Primary Examiner* — Christopher P Jones
*Assistant Examiner* — Phillip Y Shao
(74) *Attorney, Agent, or Firm* — Bochner PLLC; Andrew D. Bochner (57) ABSTRACT

Provided is an air purification apparatus and method. The apparatus comprises a body having a cavity, an air intake, and an air exhaust. A water reservoir, disposed within the cavity contains a fluid and is in fluid communication with the air intake. A first chamber is disposed within the cavity and is in fluid communication with the water reservoir and the air exhaust. A solar power assembly attaches to the body, the solar power assembly has one or more solar panels. The air purification apparatus has a battery in electrical communication with the one or more solar panels.

14 Claims, 4 Drawing Sheets

(51) Int. Cl.
  *F03D 9/00* (2016.01)
  *F03D 9/11* (2016.01)
  *B01D 46/62* (2022.01)
(52) U.S. Cl.
  CPC ............ *F03D 9/46* (2016.05); *B01D 2221/16* (2013.01); *B01D 2247/14* (2013.01); *F05B 2240/9113* (2013.01); *F05B 2260/42* (2013.01)

(56) References Cited

U.S. PATENT DOCUMENTS

| | | | | |
|---|---|---|---|---|
| 3,538,657 A * | 11/1970 | Macrow | ................ | B01D 47/16 96/286 |
| 3,624,696 A * | 11/1971 | Cohen | ................ | B01D 47/024 96/280 |
| 3,702,048 A * | 11/1972 | Howick | ................ | B01D 47/06 96/272 |
| 4,627,863 A * | 12/1986 | Klein | ................ | B01D 39/1623 55/528 |
| 4,693,734 A * | 9/1987 | Erickson, Jr. | ........... | A47L 5/365 15/353 |
| 4,986,966 A * | 1/1991 | Lehto | ................ | B01D 47/12 261/121.1 |
| 5,061,299 A * | 10/1991 | Porter, III | ............. | B01D 53/74 95/66 |
| 5,201,919 A * | 4/1993 | Jahn | ................ | B01D 47/06 96/262 |
| 5,205,846 A * | 4/1993 | Fabrizi | ................ | B01D 47/02 96/121 |
| 5,616,172 A * | 4/1997 | Tuckerman | ............... | F24F 8/80 96/57 |
| 6,379,439 B1 * | 4/2002 | Shimizu | ................ | A47L 9/182 15/353 |
| 6,749,654 B2 * | 6/2004 | Hilliard | .............. | B01D 46/0002 55/367 |
| 6,929,671 B2 * | 8/2005 | Kim | ......................... | F03D 9/25 55/385.1 |
| 7,323,792 B2 * | 1/2008 | Sohn | ..................... | F03D 1/0666 290/55 |
| 7,487,771 B1 * | 2/2009 | Eiffert | ..................... | H02S 20/23 126/622 |
| 8,075,678 B1 * | 12/2011 | Zerah | .................... | B01D 5/009 96/417 |
| 8,273,157 B1 * | 9/2012 | Dyreby | .................. | F24S 40/40 95/267 |
| 10,369,506 B1 * | 8/2019 | Hakki | ..................... | B01D 53/72 |
| 2003/0010214 A1 * | 1/2003 | Naruke | ................ | F01N 13/009 96/337 |
| 2006/0112823 A1 * | 6/2006 | Avina | ................ | B01D 53/0415 96/108 |
| 2008/0237035 A1 * | 10/2008 | Kurusu | .................. | B01D 47/06 204/242 |
| 2008/0289499 A1 * | 11/2008 | Eisenberger | ........... | B01D 53/78 236/1 R |
| 2009/0038480 A1 * | 2/2009 | Garman | ................ | F24F 1/0071 96/414 |
| 2010/0101417 A1 * | 4/2010 | Wong | ....................... | F24F 3/16 95/273 |
| 2011/0011261 A1 * | 1/2011 | Jenness | .................. | C12M 21/02 95/150 |
| 2012/0204725 A1 * | 8/2012 | Goelet | .................... | B01D 5/00 96/143 |
| 2015/0198072 A1 * | 7/2015 | Alasmari | ................ | B01D 50/006 60/274 |
| 2016/0051999 A1 * | 2/2016 | Duhaime | ................ | B09B 1/00 239/8 |
| 2017/0209825 A1 * | 7/2017 | Huang | ................ | B01D 47/022 |

* cited by examiner

APPARATUS AND METHOD FOR AIR PURIFICATION AND POWER GENERATION

FIELD OF INVENTION

The invention is in the field of air purification, specifically apparatuses and methods that purify air while using renewable energy techniques to generate power.

BACKGROUND

As cities continue to industrialize, pollution becomes a more prominent issue. Specifically, as the need to ship goods increases, there is a noticeable stress on air quality as a result of vehicle emissions. According to the Environmental Protection Agency, vehicles collectively cause seventy-five percent of carbon monoxide pollution in the United States. Pollution levels are especially elevated in areas where vehicles are most likely to idle, for example, at traffic lights and intersections. Furthermore, pollution from vehicle exhaust is especially problematic in valleys because of "inversion." Effectively, "inversion" is the principle where pollution becomes stuck in valley air for weeks at a time.

While there are air purification units in existence, many of these units require a great deal of power to run effectively. It is counterproductive for an air purification unit to remove pollutants from air, only to draw electricity from a fossil fuel power plant. Thus, there is a need to not only purify the air, but to do so in a manner that is consistent with the end-goal: a net removal of pollutants. Further, many air purification units are large and bulky or are otherwise not suitable for mounting.

It would be desirable to have apparatuses and methods of air purification that utilize renewable sources of power to operate. Further, it would desirable to have air purification apparatuses and methods configured to handle the abundance of pollutants on roadways.

SUMMARY OF THE INVENTION

The invention is an air purification apparatus comprising a body having a cavity, an air intake, and an air exhaust. In an embodiment, the apparatus further comprises a water reservoir disposed within the cavity where the water reservoir contains a fluid and is in fluid communication with the air intake. A first chamber may be disposed within the cavity where the first camber is in fluid communication with the water reservoir and the air exhaust. In an embodiment, the apparatus includes a solar power assembly attached to the body, the solar power assembly having one or more solar panels. The apparatus may also have a battery in electrical communication with the one or more solar panels. In a further embodiment, the air purification apparatus further comprises a second chamber. The air purification apparatus may also further comprise a wind power assembly having one or more wind turbines. The air purification apparatus may further comprise a computer having a processor and a memory, wherein the memory contains computer executable instructions describing how to route power throughout the apparatus. In an embodiment, the fluid within the water reservoir may be water. The water reservoir may be configured to remove a pollutant via electrochemical separation. The apparatus may further include a fluid input/output configured to transport the fluid to and from the water reservoir. The apparatus may also further comprise a solar panel frame and a solar panel mount where the solar panel frame is surrounding the one or more solar panels and the solar panel mount is disposed between the solar panel frame and the body. In addition, the solar panel mount may be adjustable.

The invention may be a method for air purification comprising the steps of determining, via a computer, whether a battery has sufficient power for at least a first induction fan and a pump, directing an untreated air from the environment into a water reservoir, filtering, via the water reservoir, the untreated air, directing the untreated air from the water reservoir to a first chamber, and filtering, via the first chamber, the untreated air. In an embodiment, the method further comprises the steps of directing the untreated air from the first chamber to a second chamber, filtering, via the second chamber, the untreated air, and directing a treated air from the second chamber to the environment. In another embodiment of the method, the computer is configured to determine whether the battery has sufficient power for at least the first induction fan and the pump by determining whether a solar panel is charging the battery. The computer may also be configured to accept power from an external source if the solar panel is not charging the battery. In one embodiment, the untreated air may be directed into the water reservoir via the pump. The untreated air may also be directed into the second chamber by the first induction fan. The treated air may be directed into the environment by a second induction fan.

DETAILED DESCRIPTION OF THE PREFERRED EMBODIMENT

The present invention adds a whole new dimension to air purification by combining methods of renewable energy production with tailored air purification processes.

Throughout the specification, wherever practicable, like structures will be identified by like reference numbers. In some figures, components, such as additional electrical connections or fasteners have been omitted for clarity in the drawings. Unless expressly stated otherwise, the term "or" means "either or both" such that "A or B" includes A alone, B alone, and both A and B together. For the purposes of this disclosure, unless specifically stated otherwise, "fluid," "air," and "water" may be used interchangeably.

Figure 1:
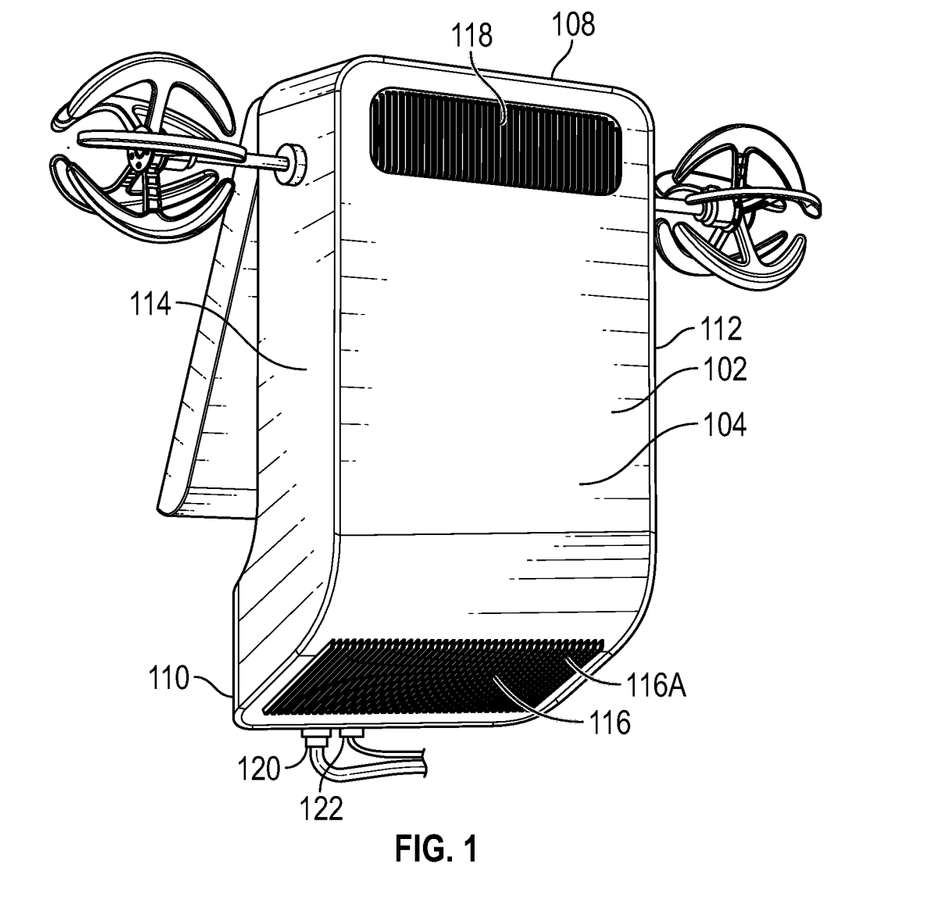
FIG. 1 is a front isometric view of an embodiment of an air purification apparatus equipped with wind turbines and solar panels.

Referring to FIG. 1, in an embodiment, the invention of the present disclosure includes a body 102. The body 102 may have a front face 104, a rear face 106, a top end 108, a bottom end 110, a right wall 112, and a left wall 114. The body 102 may be constructed from plastic, polymer, metal, wood, or any other suitable material. In one embodiment, the material is comprised of recycled materials. The body 102 may be airtight and/or watertight. In such an embodiment, gaskets, rubber, or retainers may be disposed between the components of the body 102. As a non-limiting example, the outer edges of the front face 104 may have a rubber lining that interfaces with the receiving edges of the top end 108, the bottom end 110, the right wall 112, and the left wall 114. In one embodiment, the body 102 is covered with a film or coating to increase the body 102's durability and resistance to the elements.

In an embodiment, an air intake 116 is disposed on the body 102. In one embodiment, the air intake 116 is disposed on the bottom portion of the front face 104. However, in alternate embodiments the air intake 116 may be disposed any where on the body 102. The air intake 116 may be a hole. In one embodiment, the air intake hole is rectangular and oblong. However, the air intake hole may be any shape. A grille or a grate 116A may traverse the air intake hole. As a non-limiting example, the grate 116A may be a series of vertical slats running from the left end of the air intake hole to the right end of the air intake hole. In one embodiment, the grate 116A is configured to prevent especially large debris or wildlife from entering the cavity 302. In an embodiment, an air exhaust 118 is disposed on the body 102. In one embodiment, the air exhaust 118 is disposed on the top portion of the front face 104. However, in an alternate embodiment, the air exhaust 118 may be disposed any where on the body 102. The air intake 116 may be configured to accept air or another fluid from outside the body 102. The air exhaust 118 may be configured to expel air that has been purified. The air exhaust 118 and the air intake 116 may be in fluid communication. For example, air may enter the air intake 116 at the same rate that air leaves the air exhaust 118. In an embodiment, the air exhaust 118 may include a grate similar to the grate 116A disposed over air intake 116.

Figure 2:
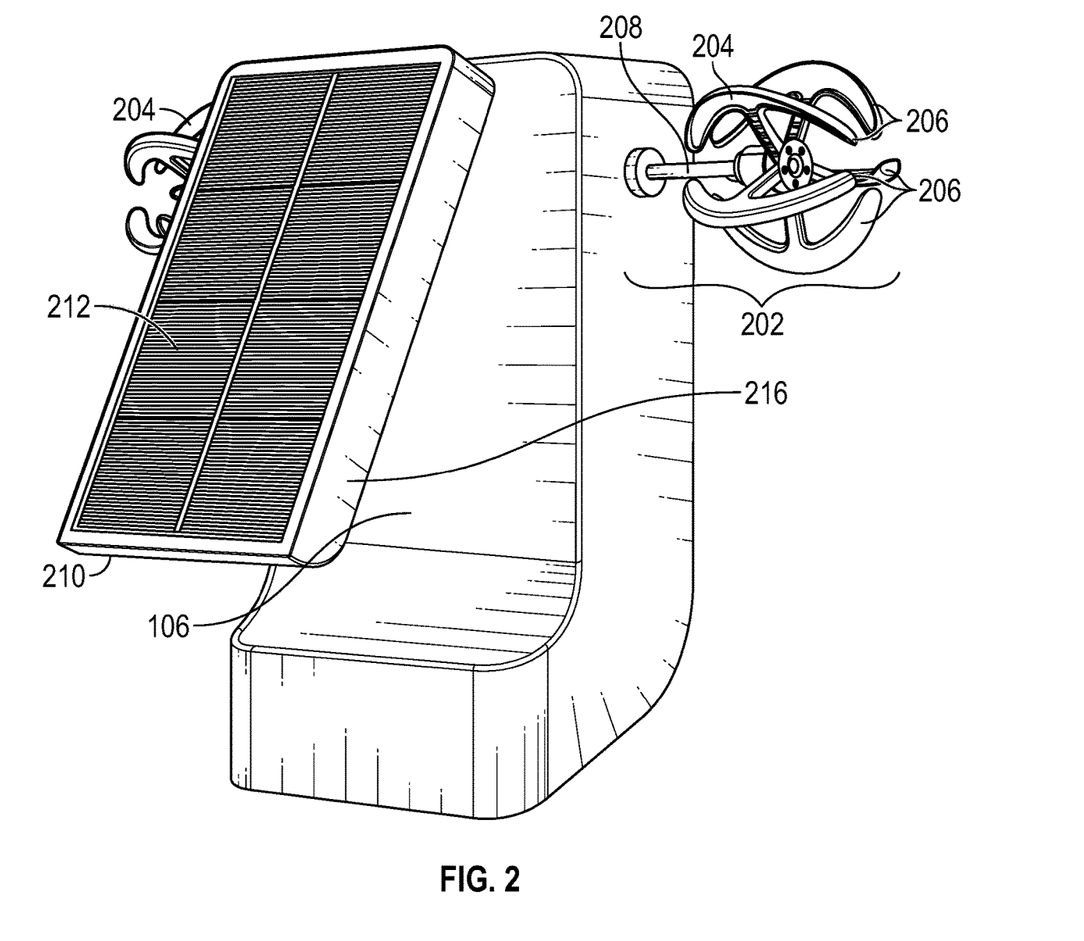
FIG. 2 is a rear isometric view of an embodiment of an air purification apparatus equipped with wind turbines and solar panels.

Referring to FIG. 2, in an embodiment, the device includes a wind power assembly 202. In one embodiment, the wind power assembly 202 includes one or more wind turbines 204. Each wind turbine 204 may include one or more blades 206. The blades 206 may be attached to a shaft 208. In one embodiment, each wind turbine 204 includes five blades 206. In an embodiment, each blade 206 may have a proximal end and a distal end. The proximal end may be the end of the blade 206 closest to the shaft 208. The distal end of the blade 206 may be curved with flanges at the outer most edge of the distal end of the blade 206. In such an embodiment, the blade 206 may be configured to capture air blowing in either direction. In a further embodiment, the stem connecting the proximal end of the blade 206 to the distal end of the blade 206 may include one or more ridges (for example, configured to better capture air). The one or more wind turbines 204 may be attached to the same shaft 208 or more that one shafts 208. In an embodiment, the shaft 208 or shafts 208 may enter the body 102. In one embodiment, the shaft 208 may be disposed through the right wall 112 and left wall 114 of the body 102. In such an embodiment, a wind turbine 204 may be disposed on each end of the shaft 208.

In an embodiment, the one or more wind turbines 204 and/or one or more shafts 208 are in mechanical communication with a wind power generator. In such an embodiment, the rotation of the turbines 204 and/or shafts 208 may cause the wind power generator to generate electricity. In one embodiment, the wind power generator is in electrical communication with the computer and/or the battery 216. As a non-limiting example, the wind power generator may first route electricity to the computer 320 and then to the battery 216. In another non-limiting example, the wind power generator may route electricity directly to the battery 216, but may still be in electrical communication with the computer 320 and receive instruction from the computer 320. In an embodiment, the wind power generator is wired into a computer 320, which will send excess power to the battery 216.

Referring to FIG. 2, in an embodiment, the device includes a solar power assembly 210. The solar power assembly 210 may include one or more solar panels 212. In an embodiment, the one or more solar panels 212 may be monocrystalline or polycrystalline. The one or more solar panels 212 may be partially surrounded by a solar panel frame 214 (for example, surrounding the top, bottom, right side, left side, and rear face of the one or more solar panels 212). The solar panel assembly 210 may be attached to the rear face 106 of the body 102. In such an embodiment, a solar panel mount may be disposed between the solar panel frame 214 and the rear face 106 of the body 102. In a further embodiment, the solar panel mount may be adjustable, enabling the angle between the body 102 and the solar panel frame 214 to change. In another embodiment, the solar panel mount is adjustable in multiple directions (for example, the solar panels 212 may be pulled further or pushed closer to the body 102, the solar panels 212 may be turned to the right, left, up, or down). In another embodiment, the solar panel mount may be motorized or otherwise configured to adjust the solar panels 212 incident to the sun (for example, moving the solar panels 212 so that the solar panels 212 are perpendicular to light being emitted by the sun). In such an embodiment, the solar panel mount may be in electrical communication with the computer 320.

In an embodiment, the device includes a battery 216. In such an embodiment, the battery 216 may be a lithium ion battery pack. The battery 216 may be disposed within the solar panel frame 214 or within the body 102 of the device. The battery 216 may be in electrical communication with the one or more solar panels 212 and/or the one or more wind turbines 204. In such an embodiment, the battery 216 is configured to store power generated by the one or more solar panels 212 and/or the one or more wind turbines 204. In an alternate embodiment, the battery 216 is located distant to the device and is tethered to the device via some length of electrical cord (for example, the cord running to the power input 122). In an alternate embodiment, the device includes more than one battery 216.

Figure 3:
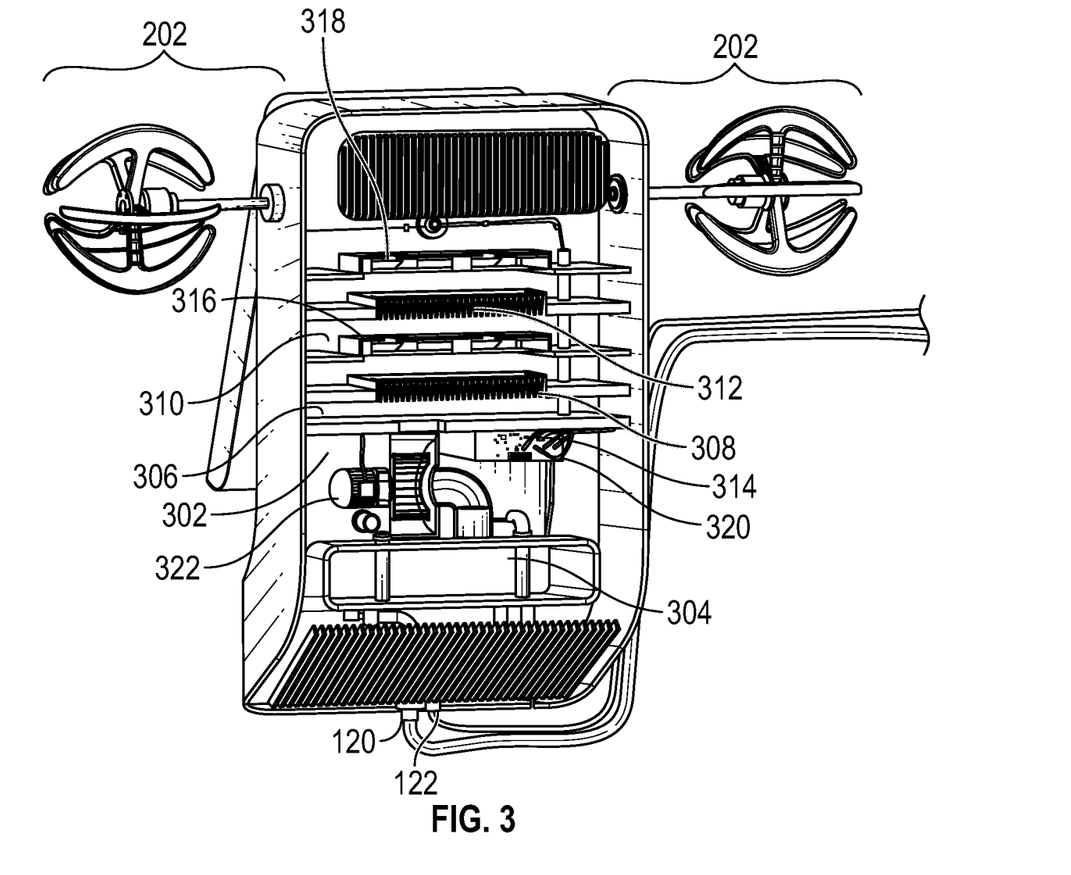
FIG. 3 is a cross-sectional view of an embodiment of an air purification apparatus.

Referring to FIG. 3, in an embodiment, the body 102 surrounds a cavity 302. In such an embodiment, the cavity 302 may be hollow and may serve as the housing for many of the filtration and electrical aspects of the device. In one embodiment, the cavity 302 includes a water reservoir 304, a first chamber 306, and a second chamber 310. The water reservoir 304 may be a chamber filled with water or another fluid. The water reservoir 304 may be configured to remove particulates from incoming air (for example, large particles or heavy toxins). The first chamber 306 and/or the second chamber 310 may include a first air filter 308 and/or a second air filter 312, respectively. In one embodiment, the water reservoir 304, the first chamber 306, and the second chamber 310 are arranged vertically. For example, the water reservoir 304 may be disposed on the bottom portion of the cavity 302, the first chamber 306 may be disposed atop the water reservoir 304, and the second chamber 310 may be disposed atop the first chamber 306. However, in alternate embodiments, the water reservoir 304, the first chamber 306, and the second chamber 310, may be arranged in any order. In one embodiment, the device includes just the water reservoir 304 and the first chamber 306. The device may also function when the water reservoir 304 is empty (for example, if the fluid cannot be resupplied, the device may still filter air without fluid in the water reservoir 304). In an alternate embodiment, the water reservoir 304 may also include a portion of filter media, enabling both fluid filtration and mechanical filtration. In one embodiment, the cavity 302 may be lined with soundproof material, in order to decrease the noise created by the device.

In an embodiment, the water reservoir 304 contains a fluid other than water. In such an embodiment, the fluid may be configured to attach to pollution particles in the air and retain them. Effectively, such a fluid may "seek" out unwanted particles and either identify, attach, or bond with the unwanted particles. In such an embodiment, this alternate fluid would be more effective at purifying the air. As a non-limiting example, the fluid may be configured to remove organic pollutants using an electrochemical separation method.

The water reservoir 304 may have a water reservoir air input and a water reservoir air output. The first chamber 306 may have a first chamber air input and a first chamber air output. The second chamber 310 may have a second chamber air input and a second chamber air output. The water reservoir 304 may also have a fluid input/output 120. In one embodiment, the fluid input/output 120 may be a single tube, which is configured to carry fluid to the water reservoir 304 and/or away from the water reservoir 304. In another embodiment, the fluid input/output 120 may be two tubes, one configured to take water from the water reservoir 304 and the other configured to carry water to the reservoir 304. The fluid input/output 120 may be in fluid communication with a reservoir tank or a water pump some distance from the device. In an embodiment, the fluid input/output 120 may include a 90-degree joint with a threaded spout.

In an embodiment, each of the water reservoir 304, first chamber 306, and second chamber 310, are self-contained in the sense that each chamber is sealed with the exception of each chamber's various inputs and/or outputs. Each chamber is configured to contain the air and channel the air from the input of the chamber to the output of the chamber.

In an embodiment, the device includes a pump 314. The pump 314 is disposed within the cavity 302 (for example, above the water reservoir 304 or computer 320). The pump 314 may be configured to pull air from outside the device, through the water reservoir input, through the fluid, and out the water reservoir output. As air enters the water reservoir 304, the air may be cleaned as it "bubbles" through the fluid. In one embodiment, the largest pollutants and/or the heavy toxins are removed via the water reservoir 304 filtration.

In an embodiment, the device has a power input 122. In one embodiment, the power input 122 is configured to carry power to the device. The power input 122 may be in communication with a power source some distance from the device. In an embodiment, the power input 122 is in electrical communication with the device.

An overflow port may be disposed within the water reservoir 304. The overflow port may be in communication with the fluid input/output 120. In an alternate embodiment, the water reservoir 304 may simply be drained with a standard hose. In an embodiment, a standard hose or a fluid input/output 120 may be used to push fresh water into the water reservoir 304 and the overflow may be configured to let the fouled fluid out. In an embodiment, the device may include a waste reservoir (for example, a chamber configured to receive waste fluid from the water reservoir 304). In an embodiment, the water reservoir 304 may be continuously refreshed with clean fluid. In another embodiment, the water reservoir 304 is refreshed with clean fluid at predetermined periods of time (for example, the water reservoir 304 is completely flushed and refilled every 12 hours). In an alternate embodiment, the water reservoir 304 includes a sensor capable of determining the level of pollutant in the fluid. In such an embodiment, this sensor may be in communication with the computer 320 and may cause the water reservoir 304 to flush and replenish at certain pollution level thresholds.

In an embodiment, the device includes one or more induction fans 316/318. The device may include a first induction fan 316 and a second induction fan 318. The one or more induction fans 316/318 may be configured to draw air into the first chamber 306 and/or the second chamber 310. The induction fans 316/318 and the pump 314 may be in electrical communication with the battery 216. The induction fans 316/318 and the pump 314 may also be in electrical communication with the power input 122. In an embodiment, the pump 314 and induction fans 316/318 draw power directly from the battery 216. The wind power generator and the one or more solar panels 212 may generate inconsistent power (for example, if there is no wind or if the sun is eclipsed by clouds). However, in an embodiment, all power inputs (wind, solar, and hardwired electricity) run directly to the battery 216 and then the battery 216 provides stable power to electrical components of the device. In an embodiment, the device includes a second induction fan 318 configured to propel the air from the second chamber 310 into the environment. In an embodiment, the first induction fan 316 and the second induction fan 318 may each be comprised of multiple fans (for example, arranged as a fan bank).

In an embodiment, the first chamber 306 and second chamber 310 contain a HEPA air filter. However, in another embodiment the first chamber 306 and second chamber 310 may contain any physical filter media configured to remove unwanted particles from air. The first and second chambers 306/310 may contain the same type of filter media or different types of filter media. In an alternate embodiment, the first chamber 306 and/or second chamber 310 contain a fluid. In such an embodiment, the first chamber 306 and/or second chamber 310 may be arranged in the same manner as the water reservoir 304. The air filter may be reusable and/or rinsable. In an embodiment, the air filters 308/312 may be sized to fit the first and second chambers 306/310. In one embodiment, the first and second chambers 306/310 may each include a filter tray. The filter trays may be sized to fit within the first and second chambers 306/310 and may be configured to slide out from the chambers 306/310. In one embodiment, the front face 104 of the device may be removable, enabling a user to remove the filter trays and/or the air filters 308/312. In another embodiment, another part of the body 102 (for example, the left wall 114 or right wall 112). In another embodiment, the front face 104 of the device may have one or more doors or access points that allow for the tray or filter to be removed. In such an embodiment, the doors or access points may be airtight. In an embodiment, the device includes a removable cap 322. The removable cap 322 may be disposed between the water reservoir 304 and the first chamber 306, such that removal of the removable cap 322 allows for easy maintenance within the water reservoir 304, first chamber 306, or between the two. In an alternate embodiment, there may be more than one removable cap 322 and they may be disposed on any internal component of the device.

In an embodiment, the device includes a computer 320. The computer 320 may be disposed within the cavity 302. In one embodiment, the device and/or the computer 320 include a processor and a memory. The memory may contain a program configured to direct the flow of power within the device. As a non-limiting example, the program may instruct the solar panel 212 and/or wind turbine 204 to send a certain quantity of power to the battery 216. As a further example, the program may instruct the solar panel 212 and/or wind turbine 204 to direct 70% of the generated power to the battery 216 and the remaining 30% to other components of the device that use power. In an embodiment, the computer 320 and the battery 216 are in communication, such that when the battery 216 reaches the maximum charge, the computer 320 directs the induction fans 316/318, pump 314, wind turbines 204, and/or solar panels 212 to cease operation. In a further embodiment, the computer 320 may direct the induction fans 316/318, pump 314, wind turbines 204, and/or solar panels 212 to resume operation when the battery 216's charge level drops to a pre-determined threshold.

In an embodiment, the device has a light sensor and/or a wind sensor. The light sensor and/or the wind sensor may be disposed on the outside of the body 102 and may be in electrical communication with the computer 320. The wind sensor may be able to determine the direction and speed of the wind. The light sensor may be able to determine the intensity and direction of incident light. The light sensor may be configured to track the apparent movement of the sun through the sky, enabling the solar panels 212 to receive the most direct sunlight. The computer 320 may be configured to receive signals from the light sensor and/or the wind sensor. The light sensor and/or wind sensor may also be configured to analyze dangerous conditions. As a non-limiting example, the wind sensor and the computer 320 may determine if the wind speed approaches velocities that could damage the device. In a further non-limiting example, the light sensor and computer 320 may determine if there is a dangerous presence of light that could damage the one or more solar panels 212 or overload the device. In an embodiment, the wind power assembly 202 may include a brake that stops the wind turbines 204 from spinning if the wind speeds are too great. In such an embodiment, the computer 320 may generate a signal to the brake if the wind sensor provides the computer 320 with information containing dangerously high winds.

In an embodiment, the computer 320 and/or the device include a receiver, a transmitter, and/or an antenna. In one embodiment, the device may send and receive wireless signals. As a non-limiting example, the device may receive a cell signal and output a Wi-Fi signal. In such an embodiment, the device may be configured to accept signals from major cell phone providers. If more than one device is within a certain proximity to one another, the group of devices may be configured to provide a mesh Wi-Fi system (for example, for a small town or a segment of a freeway). In another embodiment, the device may act as a node, boosting cell service or extending a Wi-Fi signal. In another embodiment, more than one devices may be configured to be in electrical communication with one another. For example, electrical wires may tether each device; enabling one device's solar and wind systems to charge the battery of another device.

In an embodiment, the device is configured to operate in proximity to streetlights, traffic lights, or utility poles. The device may be especially equipped for removing pollutants from vehicle exhaust fumes. In such an embodiment, the power input 122 may be in electrical communication with the power source within the streetlight, traffic light, or utility pole. The tube leading to the fluid input/output 120 may be disposed within the streetlight, traffic light, or utility pole.

The device may be attached to the traffic light or traffic light pole. In one embodiment, a standard metal clasp can be drilled into the pole in a similar fashion as to how typical lights are mounted. In one embodiment, the devices are mounted at the same height as traffic lights. In an embodiment, a device mount may be disposed between the device and the pole. In one embodiment, the device mount may have a "quick detach" feature, enabling the device to be easily removed from the device mount or the pole. In a further embodiment, the device mount may be electronically instructed to restrain or release the device. In such an embodiment, a drone may instruct the device mount and may be enabled to remove the device from the traffic light or pole. A drone may also be configured to replace air filters 308/312 or other components of the device.

The devices may be strategically placed in order to most efficiently purify air. For example, the devices may be placed at traffic lights over intersections that are especially busy or well known for carrying high-pollution vehicles. In another embodiment, the device may be placed within commercial buildings (for example, in a building's HVAC system).

In an embodiment, power may run through a step down converter, which then may route power to the battery 216. The step down converter may accept up to 16V of solar power and 16V of wind power and direct power to the battery 216 to charge evenly and effectively. However, in various embodiments, the step down converter may accept a range of voltages from the solar and/or wind units. The battery 216 may then power the rest of the unit. In an embodiment, the battery 216, solar panels 212, and/or wind turbines 204 are wired to the streetlight's power input. In such an embodiment, the device may power the streetlight or other similar electronics (for example, illuminated traffic signs, neon signs, or rail road crossing barrier motors).

Figure 4:
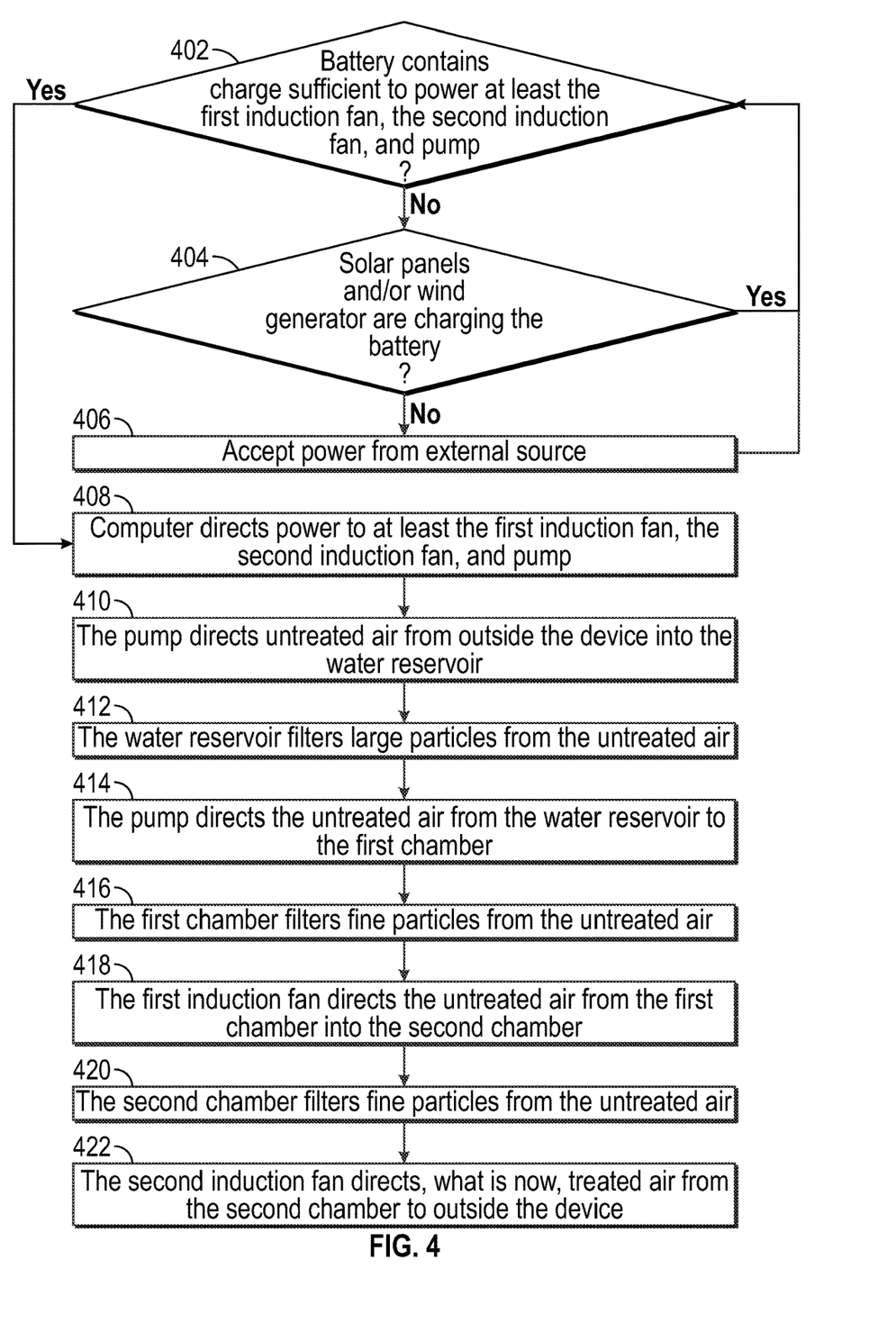
FIG. 4 is a flowchart illustrating a method of air purification.

Referring to FIG. 4, a method of air purification begins by determining whether the battery contains charge sufficient to power at least the first induction fan, the second induction fan, and pump 402. In an alternate embodiment, this determination may be made in reference to just the pump and first induction fan. As a non-limiting example, the computer may include information on the necessary power to operate the electrical components of the device. If 402 returns yes, the computer may direct power to at least the first induction fan, the second induction fan, and pump 408. If 402 returns no, and the solar panels and/or wind generator are charging the battery 404, then again a determination should be made whether the battery has sufficient power 402. As a non-limiting example, the computer may track the power input to the battery by the turbines or solar panels. In such an example, the computer may be configured to anticipate when the battery will be sufficiently charged based on the rate of energy production by the turbines or solar panels. If 404 returns no, and the solar panels and/or wind generator are not charging the battery 404, then the system may accept power from an external source 406 and once again determine whether the battery has sufficient power 402. In accepting power from an external source 406, the battery may be charged by a hardwired power source (for example, the power supply of a streetlight). In such a non-limiting example, the external source may power the battery or may power the fans and pump directly. The pump may then direct untreated air from outside the device into the water reservoir 410. The water reservoir may filter large particles from the untreated air 412. The pump may direct the untreated air from the water reservoir to the first chamber 414. In an alternate embodiment, the first induction fan may direct the untreated air from the water reservoir to the first chamber. The first chamber may filter fine particles from the untreated air 416. The first induction fan may direct the untreated air from the first chamber into the second chamber 418. The second chamber may filter fine particles from the untreated air 420. The second induction fan may direct, what is now, treated air from the second chamber to outside the device 422. In alternate embodiments, the method may utilize any number of fans or pumps. For example, in an alternate embodiment, the method utilizes a single pump and the pump is configured to propel air through the reservoir and both chambers. In another non-limiting example, the method utilizes a single induction fan and the single induction fan is configured to propel air through the reservoir and both chambers. In further alternate embodiments, any reservoir or chamber may be configured to filter any kind of particles (for example, the reservoir may filter fine particles and the first chamber may filter heavy toxins).

In an alternate embodiment, the device may be configured to receive external renewable power. As a non-limiting example, external wind turbines, hydroelectric turbines, solar panels, or other renewable sources of energy may power the device. In such a non-limiting example, these external renewable sources may be in electrical communication with the battery 216 and/or power input 122.

While certain novel features of the present invention have been shown and described, it will be understood that various omissions, substitutions and changes in the forms and details of the device illustrated and in its operation can be made by those skilled in the art without departing from the spirit of the invention.

What is claimed is:

1. An air purification apparatus comprising:
    a body comprising:
        a front face, a rear face, a top end, a bottom end, a right wall, and a left wall;
        a cavity bound by the front face, the rear face, the top end, the bottom end, the right wall, and the left wall;
        an air intake disposed on a lower end of the front face;
        an air exhaust disposed on an upper end of the front face;
        an air intake grate traversing the air intake; and
        an air exhaust grate traversing the air exhaust;
    a water reservoir disposed within the cavity, the water reservoir containing a fluid and in fluid communication with the air intake;
    a first chamber disposed within the cavity, the first chamber in fluid communication with at least the water reservoir; and
    a second chamber disposed within the cavity, the second chamber in fluid communication with at least the first chamber and the air exhaust;
    a pump configured at least to propel air through the water reservoir;
    a power assembly configured to power at least the pump; and
    a battery in electrical communication with at least the power assembly.

2. The air purification apparatus of claim 1, wherein the power assembly is a solar power assembly attached to the body, the solar power assembly having one or more solar panels.

3. The air purification apparatus of claim 1, further comprising a first induction fan configured to draw air through the first chamber and a second induction fan configured to draw air through the second chamber.

4. The air purification apparatus of claim 1, wherein the air intake grate and the air exhaust grate are vertical slats.

5. The air purification apparatus of claim 1, wherein the power assembly is a wind power assembly having one or more wind turbines.

6. The air purification apparatus of claim 5, wherein each of the one or more wind turbines has a plurality of blades, each blade having a proximal end and a distal end, the distal end having a flanged rim, and wherein a first of the one or more wind turbines is disposed on the left wall and a second of the one or more wind turbines is disposed on the right wall.

7. The air purification apparatus of claim 1, further comprising:
    a fluid input/output configured to transport the fluid to and from the water reservoir; and
    a computer having a processor and a memory, wherein the memory contains computer executable instructions causing, via the processor, the fluid input/output to replenish the fluid in the water reservoir at a predetermined pollution level threshold.

8. The air purification apparatus of claim 1, wherein the fluid is water.

9. The air purification apparatus of claim 1, wherein the water reservoir is configured to remove a pollutant via electrochemical separation.

10. The air purification apparatus of claim 1, further comprising a removable cap configured to removable provide access to the water reservoir.

11. The air purification apparatus of claim 2, further comprising a solar panel frame and a solar panel mount, the solar panel frame surrounding the one or more solar panels and the solar panel mount disposed between the solar panel frame and the body.

12. The air purification apparatus of claim 11, wherein the solar panel mount is adjustable.

13. The air purification apparatus of claim 1, further comprising a computer, wherein the computer is a node in a mesh network, the node configured to extend a wireless signal.

14. The air purification apparatus of claim 1, wherein the second chamber is disposed above the first chamber.

* * * * *